(12) United States Patent
Tong et al.

(10) Patent No.: US 11,037,282 B2
(45) Date of Patent: Jun. 15, 2021

(54) DETECTION OF CLARITY MARKINGS IN GEMSTONES

(71) Applicant: INTERNATIONAL BUSINESS MACHINES CORPORATION, Armonk, NY (US)

(72) Inventors: Matthew Harrison Tong, Austin, TX (US); Sahil Dureja, Austin, TX (US); Venkat K. Balagurusamy, Suffern, NY (US); Donna Dillenberger, Yorktown Heights, NY (US); Joseph Ligman, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 16/415,132

(22) Filed: May 17, 2019

(65) Prior Publication Data

US 2020/0364846 A1 Nov. 19, 2020

(51) Int. Cl.
*G06T 7/00* (2017.01)
*G06K 9/00* (2006.01)
(Continued)

(52) U.S. Cl.
CPC ........ *G06T 7/0002* (2013.01); *G06K 9/00496* (2013.01); *G06N 3/08* (2013.01);
(Continued)

(58) Field of Classification Search
None
See application file for complete search history.

(56) References Cited

U.S. PATENT DOCUMENTS 7,259,839 B2 8/2007 Sivovolenko et al.
8,878,145 B1 11/2014 Liu
(Continued)

OTHER PUBLICATIONS

Marex, "IBM Introduces New Authenticity Tool." May 26, 2018, Online, URL<https://www.maritime-executive.com/article/ibm-introduces-new-authenticity-tool>, 2 pages.
(Continued)

*Primary Examiner* — Delomia L Gilliard
(74) *Attorney, Agent, or Firm* — Cantor Colburn LLP; Anthony Curro

(57) ABSTRACT

A gemstone detection method is provided and includes using a camera to generate a set of training pictures illustrating three-dimensional features of a gemstone cut with a pattern. Each training picture in the set of training pictures includes facets of and inclusions within the gemstone visible along a point-of-view (POV) through the gemstone. The gemstone detection method further includes generating a trained neural network by training an untrained neural network using the set of training pictures and a set of training sketches of edges of the facets of the gemstone generated from the set of training pictures and using the trained neural network to iteratively generate machine-generated drawings from the set of training pictures. Each of the machine-generated drawings identifies edges of the facets of the gemstone. In addition, the gemstone detection method includes combining the set of machine-generated drawings into a three-dimensional model.

20 Claims, 7 Drawing Sheets

(51) Int. Cl.
*G06N 20/00* (2019.01)
*G06N 3/08* (2006.01)

(52) U.S. Cl.
CPC .... *G06N 20/00* (2019.01); *G06T 2207/20081* (2013.01); *G06T 2207/20084* (2013.01)

(56) References Cited

U.S. PATENT DOCUMENTS

| | | |
|---|---|---|
| 9,953,406 B2 | 4/2018 | Verboven et al. |
| 2004/0072137 A1* | 4/2004 | Lapa ................... G09B 25/00 434/386 |
| 2006/0062446 A1 | 3/2006 | Porat |
| 2010/0088348 A1* | 4/2010 | Verboven ............ G06F 16/2282 707/802 |
| 2010/0141929 A1 | 6/2010 | Liu et al. |
| 2012/0274751 A1* | 11/2012 | Smith ................... G01N 21/87 348/52 |
| 2015/0253255 A1* | 9/2015 | Wagner ................ G02B 27/027 356/30 |
| 2016/0004926 A1 | 1/2016 | Kerner et al. |
| 2017/0329840 A1* | 11/2017 | McGowan .......... G06F 3/04815 |
| 2018/0342053 A1* | 11/2018 | Balagurusamy .......... G06T 7/11 |
| 2020/0011807 A1* | 1/2020 | Holloway ............. G01N 21/87 |

OTHER PUBLICATIONS

Sarine, "Galaxy® XL," [Accessed Oct. 29, 2018] Online, URL<https://sarine.com/products/galaxy-xl/>, 3 pages.

* cited by examiner

Training image

Training labels

Initial network output

Output post-training

DETECTION OF CLARITY MARKINGS IN GEMSTONES

BACKGROUND

The present invention generally relates to the measurement of a gemstone's 3D structure and the detection of clarity markings, and more specifically, to a machine-learning method for detection of clarity features in gemstones and the generation of a report and model of a gemstone's cut.

Certain gemstones, such as diamonds, have a high inherent value based on their individual characteristics. For any particular diamond, these characteristics include its cut, carat weight, clarity, and color. The cut refers to the number and arrangement of faces of the diamond, the carat weight refers to the size of the diamond, the clarity refers to the lack of inclusions in the diamond, and the color refers to how close the diamond's color is to white or colorless.

SUMMARY

Embodiments of the present invention are directed to a gemstone detection method. A non-limiting example of the gemstone detection method includes using a camera to generate a set of training pictures illustrating three-dimensional features of a gemstone cut with a pattern. Each training picture in the set of training pictures includes facets of and inclusions within the gemstone visible along a point-of-view (POV) through the gemstone. The gemstone detection method further includes generating a trained neural network by training an untrained neural network using the set of training pictures and a set of training sketches of edges of the facets of the gemstone generated from the set of training pictures and using the trained neural network to iteratively generate machine-generated drawings from the set of training pictures. Each of the machine-generated drawings identifies edges of the facets of the gemstone. In addition, the gemstone detection method includes combining the set of machine-generated drawings into a three-dimensional model.

Embodiments of the present invention are directed to a computer program product for gemstone analysis. A non-limiting example of the computer program product for gemstone analysis includes a processor and a memory unit. The memory unit has executable instructions stored thereon, which, when executed, cause the processor to execute a gemstone detection method. The gemstone detection method includes using a camera to generate a set of training pictures illustrating three-dimensional features of a gemstone cut with a pattern. Each training picture in the set of training pictures includes facets of and inclusions within the gemstone visible along a point-of-view (POV) through the gemstone. The gemstone detection method further includes generating a trained neural network by training an untrained neural network using the set of training pictures and a set of training sketches of edges of the facets of the gemstone generated from the set of training pictures and using the trained neural network to iteratively generate machine-generated drawings from the set of training pictures. Each of the machine-generated drawings identifies edges of the facets of the gemstone. In addition, the gemstone detection method includes combining the set of machine-generated drawings into a three-dimensional model.

Embodiments of the present invention are directed to a gemstone analysis system. A non-limiting example of the gemstone analysis system includes a camera, a cutting tool, a processor and a memory unit having executable instructions stored thereon, which, when executed, cause the processor to execute a gemstone detection method. The gemstone detecting method includes using a camera to generate a set of training pictures illustrating three-dimensional features of a gemstone cut with a pattern. Each training picture in the set of training pictures includes facets of and inclusions within the gemstone visible along a point-of-view (POV) through the gemstone. The gemstone detection method further includes generating a trained neural network by training an untrained neural network using the set of training pictures and a set of training sketches of edges of the facets of the gemstone generated from the set of training pictures and using the trained neural network to iteratively generate machine-generated drawings from the set of training pictures and to identify precise locations of inclusions within the gemstone, developing a plan to recut the gemstone around the precise locations to produce two or more secondary gemstones and controlling the cutting tool to re-cut the gemstone into the secondary gemstones.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
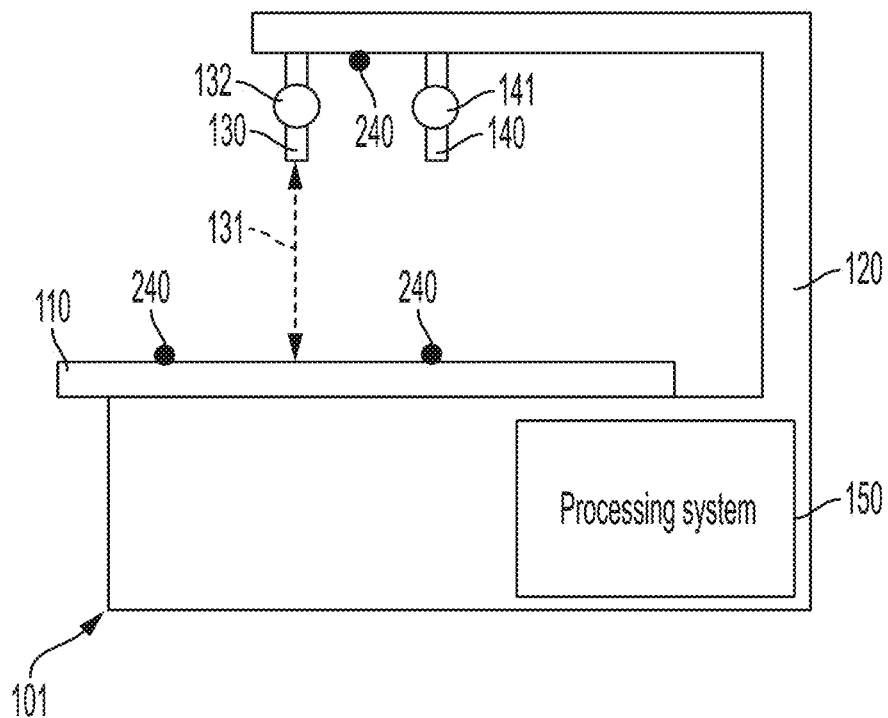
FIG. 1 is a schematic diagram of a gemstone analysis system in accordance with embodiments of the present invention.

The diagrams depicted herein are illustrative. There can be many variations to the diagram or the operations described therein without departing from the spirit of the invention. For instance, the actions can be performed in a differing order or actions can be added, deleted or modified.

Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a diamond that is mined but which has not yet been cut is referred to as an "uncut" diamond. Algorithms are available for assisting in the initial cutting of an uncut diamond to facilitate the production of one or more cut diamonds resulting from the initial cutting with a highest value possible given the characteristics of the original uncut diamond. For each of these one or more cut diamonds, it is understood that various defects, inclusions, and other clarity features can affect that cut diamond's clarity grading and hence its value and certain algorithms are available for detecting and measuring such defects, inclusions and other clarity features in cut diamonds.

Because many cut diamonds, even ones of relatively lower quality or value, have multiple reflective or transparent faces as well as a highly transparent interior, images of cut diamonds can have many observed features that are irrelevant. For example, a two-dimensional top-down image of a round, brilliant cut diamond with a few inclusions will include at least details of the edges and faces of its uppermost surfaces, details of the edges and faces of its lower most surfaces and the edges of the inclusions. No algorithms are presently available which employ neural networks to learn how to detect the edges of those inclusions and how to differentiate them from the details of the edges and faces of its uppermost surfaces and the details of the edges and faces of its lower most surfaces.

Turning now to an overview of the aspects of the invention, one or more embodiments of the invention address the above-described shortcomings of the prior art by providing a method and system in which neural networks are employed to learn, without human intervention, how to detect inclusions in cut diamonds from images of the cut diamonds and how to differentiate such inclusions from facet or edge features that are consistent with the cut of the cut diamonds and are present in those images. By thus accurately identifying the inclusions within the image, a human grader can be assisted in grading a stone or determining how it could be recut to improve its value. Alternatively, the output can be fed into an automatic grading system.

The above-described aspects of the invention address the shortcomings of the prior art by training a neural network model to detect inclusions and other clarity features in gemstones using digital images of gemstones and ground truth locations of inclusions as well as other information about the gemstone (e.g., its two- or three-dimensional facet structure) and thus detecting inclusions and other clarity features in gemstones using digital images thereof. That is, given an image or sequence of images of a gemstone, a neural network identifies pixels belonging to clarity features. An output could be in the form of segmentation masks, with pixels belonging to inclusions marked separately from those pixels belonging to the rest of the diamond, where the segmentation masks can differentiate between different kinds of inclusions and provide confidence scores relating to the likelihood of an inclusion being present in a location.

Turning now to a more detailed description of aspects of the present invention, FIG. 1 depicts a schematic view of a gemstone analysis system 101.

As shown in FIG. 1, the gemstone analysis system 101 includes a jig 110 on which a gemstone, such as a diamond is disposable, a support structure 120, an image forming device (hereinafter referred to as a "camera") 130 and a cutting tool 140. The camera 130 is supported by the support structure 120 to be configured or otherwise positioned proximate to the gemstone. The camera 130 is further configured to be operable to generate an image of the gemstone that is taken along one or more points-of-view (POVs) 131 defined from the camera 130 through the gemstone. To this end, the support structure 120 includes a camera support arm 132 which is capable of maneuvering the camera 130 with freedom of movement in multiple axes. The cutting tool 140 is supported by the support structure 120 to be configured or otherwise positioned proximate to the gemstone.

The cutting tool 140 can include or be provided as any type of cutting tool that is capable of cutting various types of gemstones, including diamonds, and is further configured to be operable to cut the gemstone in one or more axes and directions. To this end, the support structure 120 includes a cutting tool support arm 141 which is capable of maneuvering the cutting tool 140 with freedom of movement in multiple axes.

The gemstone analysis system 101 further includes a processing system 150. The processing system 150 is capable of controlling the jig 110, the support structure 120, the camera 130 (and the camera support arm 132) and the cutting tool 140 (and the cutting tool support arm 141).

Figure 2:
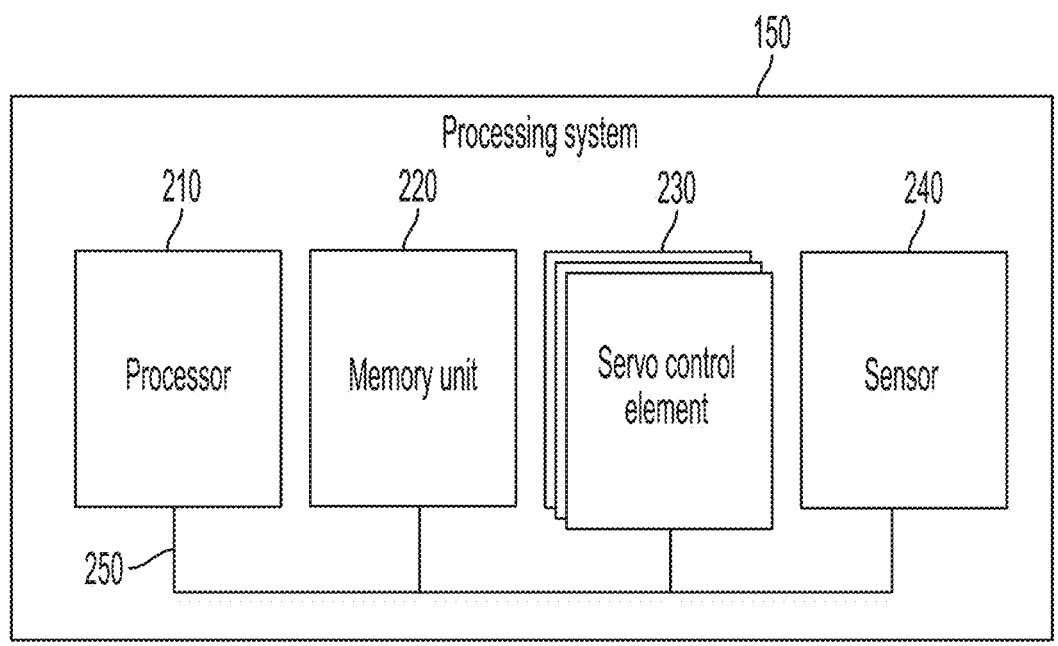
FIG. 2 is a schematic diagram of a processing system of the gemstone analysis system of FIG. 1 in accordance with embodiments of the present invention.

With reference to FIG. 2, the processing system 150 of the gemstone analysis system 101 includes a processor 210, a memory unit 220, multiple servo control elements 230, multiple sensors 240 and an input/output (I/O) bus 250 by which the processor 210, the memory unit 220, the multiple servo control elements 230 and the multiple sensors 240 are communicative. The multiple servo control elements 230 are operably interposed between the processor 210 and the jig 110, the support structure 120, the camera 130 (and the camera support arm 132) and the cutting tool 140 (and the cutting tool support arm 141) whereby the processor 210 controls the jig 110, the support structure 120, the camera 130 (and the camera support arm 132) and the cutting tool 140 (and the cutting tool support arm 141) by way of the multiple servo control elements 230. The multiple sensors 240 are distributed in various locations of the gemstone analysis system 101 and are operably disposed to sense various conditions thereof and to report sensing results to the processor 210 (e.g., to sense real-time positions of the camera support arm 132 to facilitate the processor 210 positioning the camera 130 in a predefined position relative to the gemstone). The memory unit 220 has executable instructions stored thereon, which, when executed, cause the processor 210 to execute a gemstone clarity marking detection method as described below.

Figure 3:
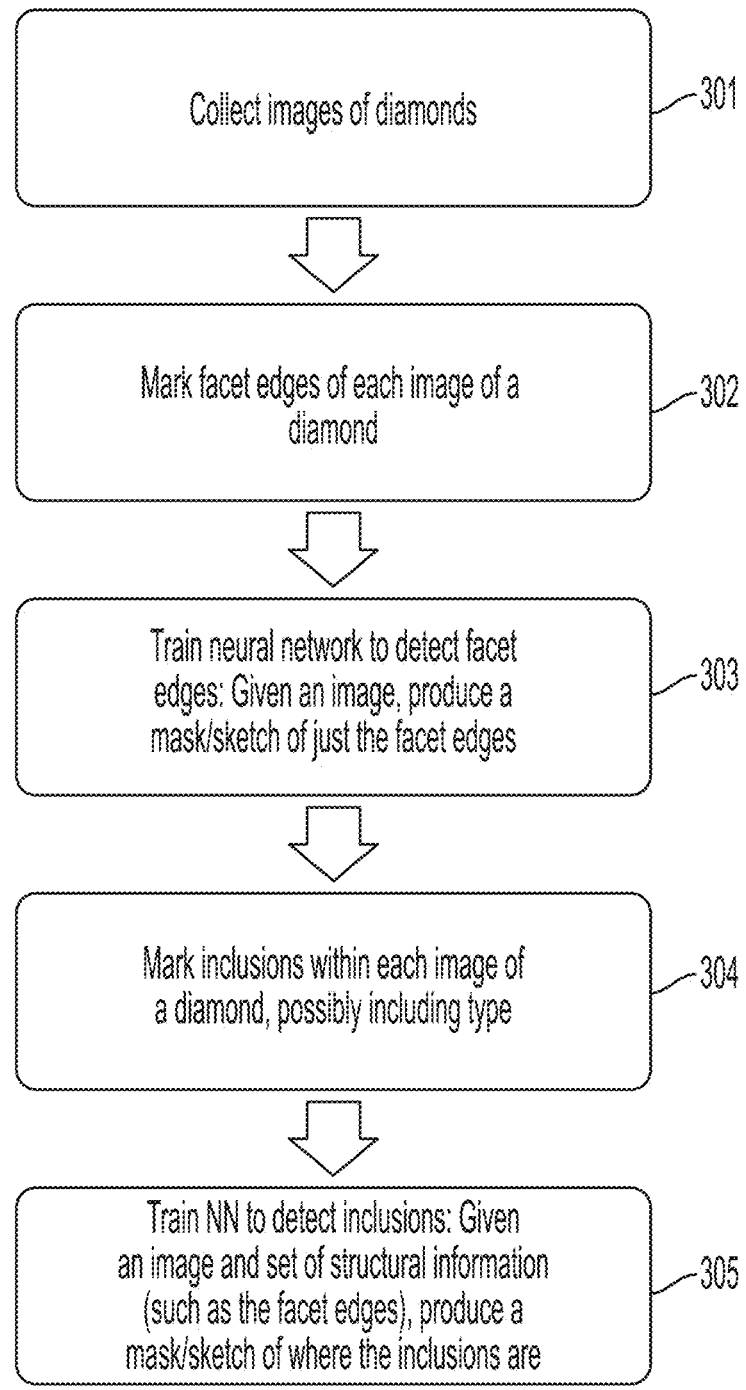
FIG. 3 is a flow diagram illustrating the training involved in the gemstone structure and clarity marking detection system whereby neural networks are trained.

With continued reference to FIGS. 1 and 2 and with additional reference to FIG. 3, the gemstone clarity feature detection method includes the following operations.

The gemstone clarity marking detection method includes placing a gemstone, which is previously cut with a cut pattern, on the jig 110 and positioning the camera 130 to have a POV 131 through the gemstone. In accordance with embodiments of the present invention, the gemstone is a diamond and the cut pattern is one of round, princess, oval, marquise, pear, cushion, emerald, asscher, radiant and heart. In accordance with further embodiments, the POV 131 can be a top-down, a side-to-side, a bottom-up or any other POV. It is to be understood, however, that the gemstone could be any type of gemstone and that other cuts are possible. The following description will, however, relate to the embodiment in which the gemstone is a round cut diamond (i.e., the diamond has previously been cut with a round cut pattern) and that the POV 131 is a top-down POV 131 unless otherwise noted for purposes of clarity and brevity.

In addition, it is to be understood that the round cut diamond's interior is highly transparent and reflective. As such, the camera 130 with the top-down POV 131 is capable of observing upward and downward facing facets of the outer surface of the round cut diamond as well as inclusions within the highly transparent interior and reflections of facet edges and inclusions.

Once the camera 130 is positioned, the method further includes using the camera 130 to generate a picture along the top-down POV 131 (301). This picture could be a digital image, for example, and is receivable by the processor 210 from the camera 130 via the I/O bus 250. The picture illustrates the three-dimensional features of the round cut diamond. Since the interior of the round cut diamond is formed with highly transparent material, the three-dimensional features include upward and downward facing facets of the outer surface of the round cut diamond as well as inclusions within the highly transparent interior of the round cut diamond.

The camera 130 generates a set of pictures that will be used as training images in accordance with aspects of the invention. With the set of training pictures generated by the camera 130 having been received by the processor 210, the processor 210 is configured to train a machine learning model to thus generate a trained neural network using the set of training pictures and a set of training sketches of edges of the facets of the gemstone generated from the set of training pictures. The trained neural network is trained such that for each image in the training set, the trainwed neural network is capable of producing a machine-generated drawing that approximates the training pictures and training sketches the trained neural network was trained with (303).

By training a neural network in this way, the trained neural network is able to detect facet edges. If the set of training pictures is chosen to be suitably diverse to carat, color, and grade, then the trained neural network will function invariant to these characteristics.

Figure 4:
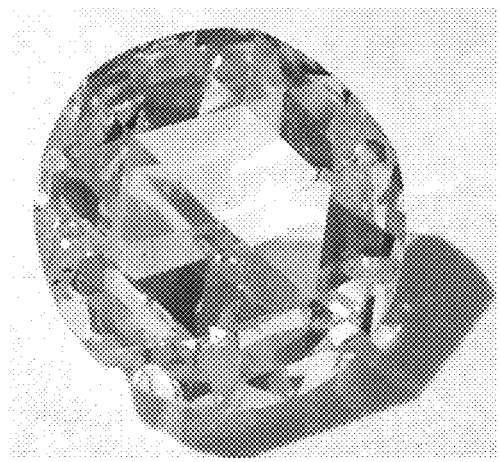
FIG. 4 is a diagram illustrating a method of training a model to produce a sketch of facet edges of the gemstone structure detection method of FIG. 3 in accordance with embodiments of the present invention.
Figure 4:
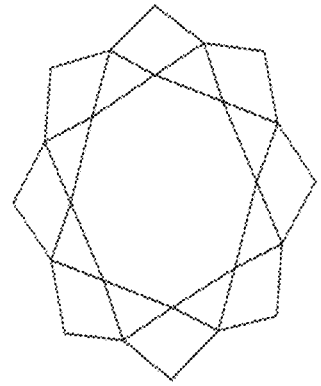
Figure 4:
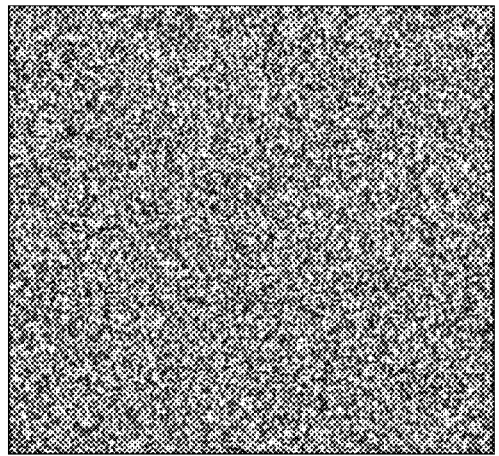
Figure 4:
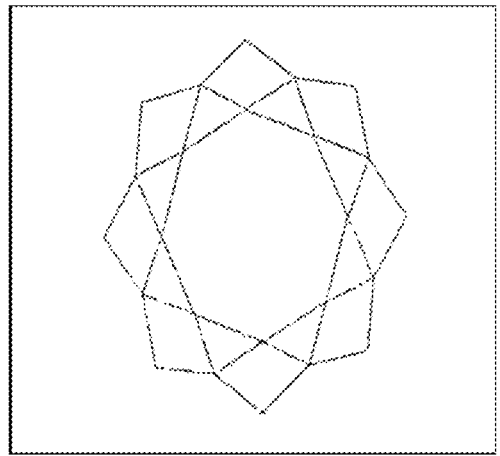

The process described in the previous paragraph is outlined in greater detail in FIG. 4. An untrained neural network is given an input image of a gemstone, shown in the top left. Initially, its output is uninformed and random, as shown in the bottom left. Its output is compared with a target output denoting what the network should output (top right). This comparison generates an error signal which the network can use to learn; this is performed for each pixel, comparing how closely the network's output matches the target. At the end of an iterative learning process involving many such images and targets, the network has learned to approximate the target output as shown in the lower right. In other words, it has learned to detect the pixels that correspond to facet edges, ignoring edges due to inclusions, reflections or facets viewed through the stone. Critically, this learned identification process works on new stones that were not included in the training set, and which can differ greatly from any stone in the set.

Information from detected facets and inclusions from multiple POVs are combined to create a 3D model of the gemstone (see FIG. 7 to be described below) and a report can be generated to describe the analysis. The generated report can serve as or support the report generated by a gemologist depicting the cut of the diamond and the location and shape of inclusions that can be used for appraising and authentication of the diamond.

Figure 5:
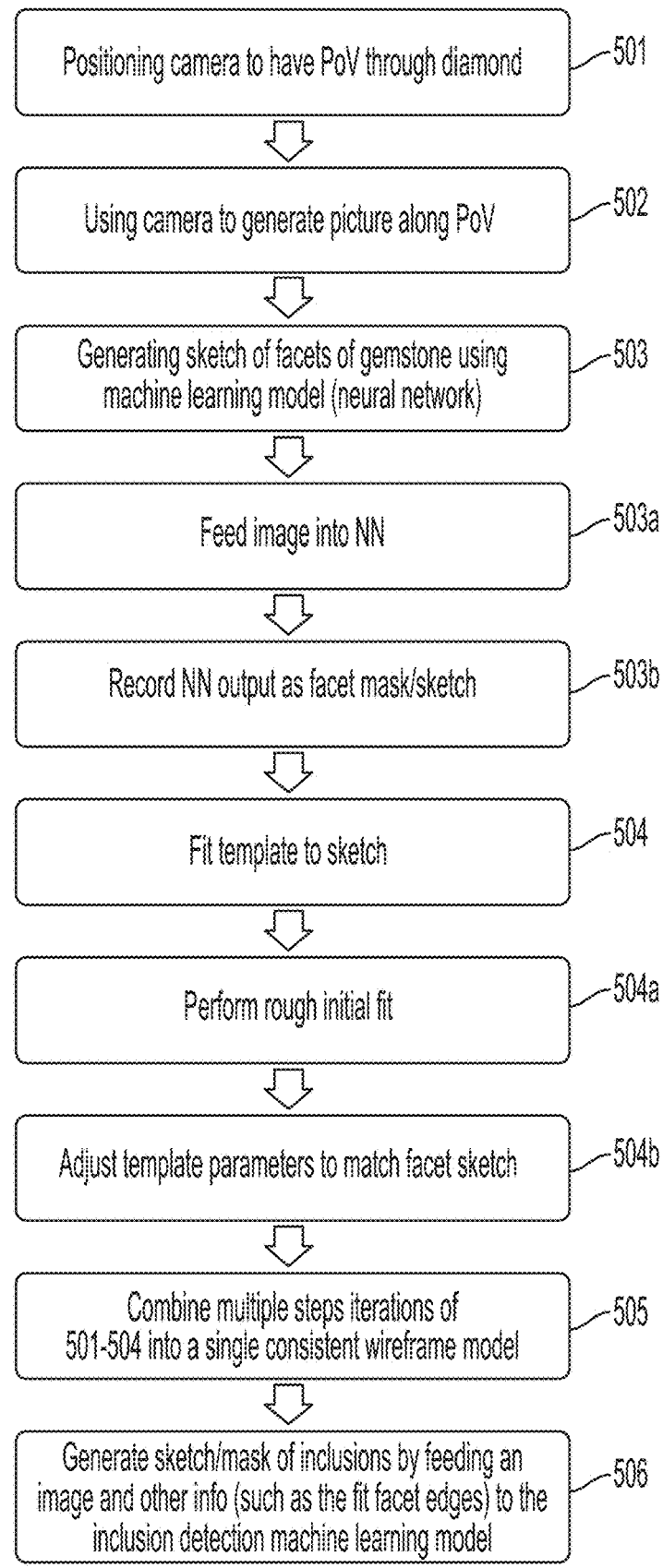
FIG. 5 is a flow diagram illustrating a gemstone structure and clarity marking detection method for execution by the gemstone analysis system of FIG. 1 in accordance with embodiments of the present invention.
Figure 6:
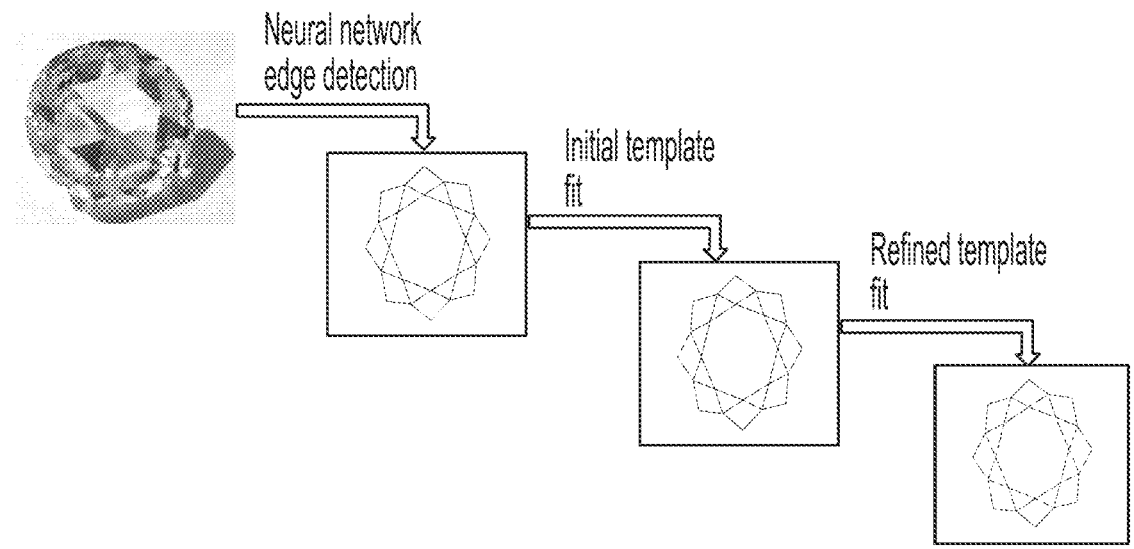
FIG. 6 is a diagram illustrating a method of taking an image, running it through a trained machine learning model, and producing a fit template.

With reference to FIG. 5, a method of analyzing a gemstone in accordance with the previous methods will now be described. The following description will relate to the case of the gemstone being a round cut diamond for purposes of clarity and brevity.

The picture generated by the camera 130, which is positioned to have its PoV through the round cut diamond (501), is generated (502) and received by the processor 210. The processor 210 is configured to generate a sketch of edges of the facets of the round cut diamond (503) by feeding the picture into the neural network (NN in FIG. 5) (503a) and recording the NN output as a facet match/sketch (503b). The processor 210 then uses the machine learning model of the NN described above to fit the sketch with a model template (504). Here, the model template is associated with the same type of round cut diamond which is and consistent with the current POV and the fitting is executed in order to thereby identify similarities between the sketch and the template model and to determine, in accordance with the matches identified by results of the comparing, which of the edges of the sketch are likely to be associated with the facets of the cut. The fitting iteratively proceeds from a rough initial fit (504a) to a finer fit. The template is then adjusted to best match the detected edges produced in the sketch by the machine learning model (504b).

One method of achieving an adjusted match is to first coarsely align the template with the sketch of the edges and then iteratively apply gradient descent to improve the match. This process is outlined in FIG. 5. An initial image is given to a neural network which determines which pixels are facet edges. A coarse initial fit to the template is given, and that fit is refined until it matches the detected facet edge pixels.

Figure 7:
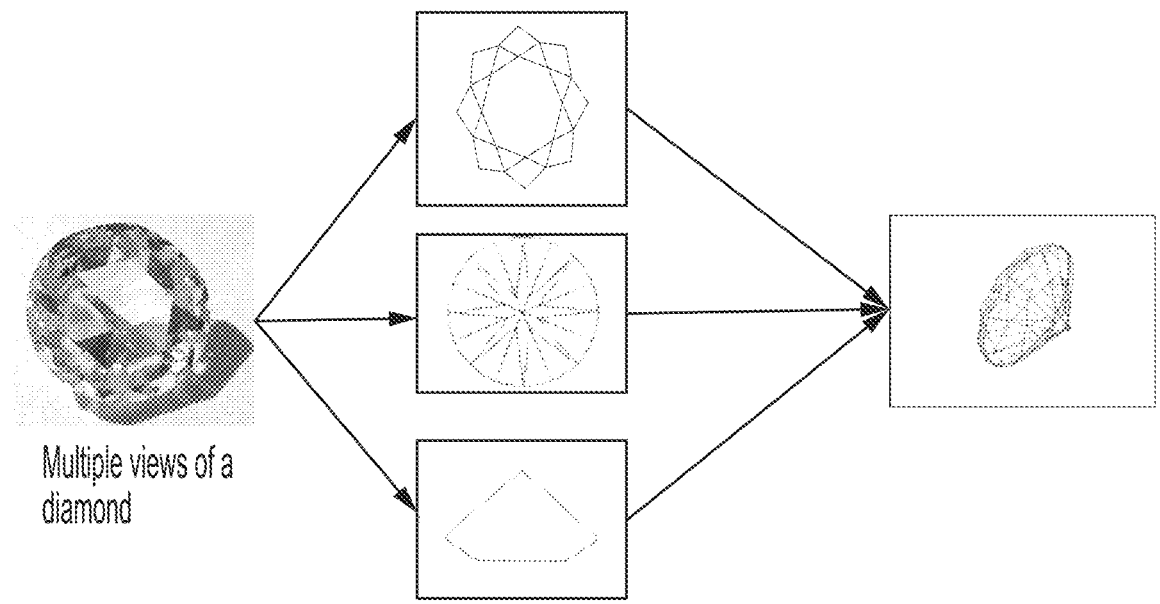
FIG. 7 is a diagram illustrating how multiple views are combined to form a 3D model.

With several pictures generated by the camera 130 having been received by the processor 210 from different PoVs, the information from these views is combined to form a full 3D wireframe model of the round cut diamond (505). At the same time, standard measurements of the diamond (e.g. table size, star length) can be made. This combination process is shown in FIG. 7, where the process described above is performed on several different point of views of the same diamond, and these different fit templates are then combined into a model that fully describes the facet structure of the diamond.

With reference back to FIG. 3, for each image of a gemstone in the training set of images, a sketch or mask is made (304) either by hand or by other means, denoting which pixels of the image compose clarity features. Such features can be inclusions within the diamond, reflections of inclusions, or surface blemishes, but are not limited to this list. This model can take as input a picture of the stone and any structural information obtained by the methods above, such as where the facet edges are. The model is trained such that for each image in the training set, it produces a sketch that approximates the mask it is trained with (305). By training a machine learning model in this way, it produces a method of detecting clarity features. The labels produced can either be simply at the inclusions vs non-inclusion level, or the model can indicate the type of feature including whether or not it is a reflection. If the training set is chosen to be suitably diverse to carat, color, and grade, then the resulting machine learning model will function invariant to these characteristics.

Figure 8:
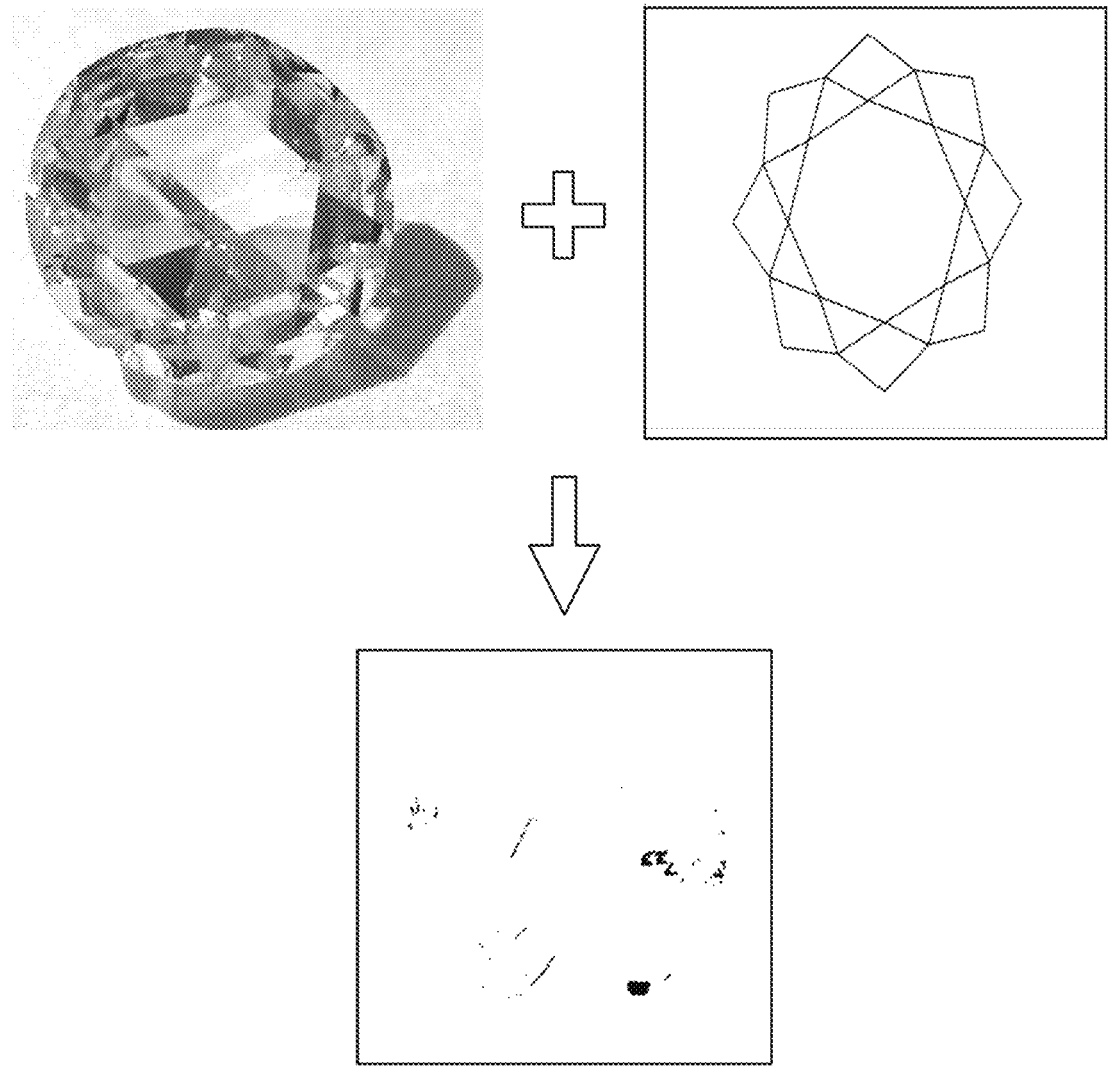
FIG. 8 is a diagram illustrating how inclusion detection can occur

An example of the inputs and outputs of this network are shown in FIG. 8. In this particular example, the inputs to the network were the image of the stone and the edges of the facets in that image, and the output was a mask with each inclusion shown in white.

In accordance with embodiments of the present invention, the computation of operation 305 is invariant to carat weight and color of the round cut diamond.

Figure 9:
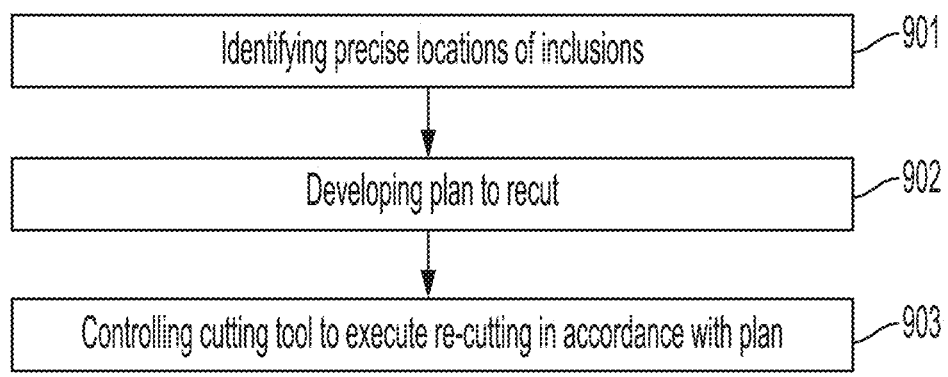
FIG. 9 is a flow diagram illustrating additional operations of the gemstone clarity marking detection method of FIG. 3 in accordance with embodiments of the present invention.

With reference to FIG. 9, the gemstone clarity marking detection method can further include identifying precise locations of the inclusions of the round cut diamond in accordance with the determining by, for example, repeating the processing described above with respect to FIGS. 3-6 in two or more directions relative to the round cut diamond (901) and developing a plan to recut the round cut diamond around the precise locations in order to produce two or more secondary gemstones (902). In accordance with embodiments of the present invention, the gemstone clarity marking detection method can also include controlling the cutting tool 140 to re-cut the round cut diamond into the secondary diamonds of various cuts in accordance with the plan (903).

Thus, in an event a round cut diamond is found to have a large inclusion in its transparent interior and thus a reduced value, the round cut diamond can be re-cut by the cutting tool 140 around the inclusion so as to produce a set of newly cut diamonds that do not have the inclusion. The resulting set of newly recut diamonds can in some cases have a greater total value than the original round cut diamond.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A gemstone detection method comprising:
   using a camera to generate a set of training pictures illustrating three-dimensional features of a gemstone cut with a pattern, each training picture in the set of training pictures comprising facets of and inclusions within the gemstone visible along a point-of-view (POV) through the gemstone;
   generating a trained neural network by training an untrained neural network using the set of training pictures and a set of training sketches of edges of the facets of the gemstone generated from the set of training pictures such that, for each training picture, the trained neural network is capable of detecting facet edges to thereby produce machine-generated drawings approximating the facets of the gemstone in the training pictures and the training sketches the trained neural network was trained with;
   using the trained neural network to iteratively the generate machine-generated drawings from the set of training pictures, wherein each of the machine-generated drawings identifies edges of the facets of the gemstone; and
   combining the set of machine-generated drawings into a three-dimensional model.

2. The method according to claim 1, wherein the gemstone comprises a diamond and the pattern is one of round, princess, oval, marquise, pear, cushion, emerald, asscher, radiant and heart.

3. The method according to claim 1, wherein the POV is one or more of a top-down, sideways or bottom-up POV.

4. The method according to claim 1, wherein the pictures of the set of training pictures comprise digital images.

5. The method according to claim 1, wherein the generating of the trained neural network is invariant to carat weight and color of the gemstone.

6. The method according to claim 1, further comprising fitting a template of a facet structure of a gemstone.

7. The method according to claim 1, wherein the generating of the trained neural network comprises:
provthiding an untrained neural network with an input image of a gemstone;
registering that an output of the untrained neural network exists;
comparing, for each pixel in the input image, the output with a target output to generate an error signal for each pixel; and
iteratively repeating the providing, the registering and the comparing for multiple input images and multiple target outputs until the output of the untrained neural network approximates the target output.

8. The method according to claim 1, wherein the generating of the trained neural network comprises training the untrained neural network to identify precise locations of inclusions within the gemstone and the method further comprises:
developing a plan to recut the gemstone around the precise locations to produce two or more secondary gemstones; and
re-cutting the gemstone into the secondary gemstones.

9. A computer program product stored on a non-transitory computer readable storage medium for gemstone analysis, comprising:
a processor; and
a memory unit having executable instructions stored thereon, which, when executed, cause the processor to execute a gemstone clarity marking detection method comprising:
using a camera to generate a set of training pictures illustrating three-dimensional features of a gemstone cut with a pattern, each training picture in the set of training pictures comprising facets of and inclusions within the gemstone visible along a point-of-view (POV) through the gemstone;
generating a trained neural network by training an untrained neural network using the set of training pictures and a set of training sketches of edges of the facets of the gemstone generated from the set of training pictures such that, for each training picture, the trained neural network is capable of detecting facet edges to thereby produce machine-generated drawings approximating the facets of the gemstone in the training pictures and the training sketches the trained neural network was trained with;
using the trained neural network to iteratively generate machine-generated drawings from the set of training pictures, wherein each of the machine-generated drawings identifies edges of the facets of the gemstone; and
combining the set of machine-generated drawings into a three-dimensional model.

10. The computer program product according to claim 9, wherein the gemstone comprises a diamond and the pattern is one of round, princess, oval, marquise, pear, cushion, emerald, asscher, radiant and heart.

11. The computer program product according to claim 9, wherein the POV is one or more of a top-down, sideways or bottom-up POV.

12. The computer program product according to claim 9, wherein the pictures of the set of training pictures comprise digital images.

13. The computer program product according to claim 9, wherein the generating of the trained neural network is invariant to carat weight and color of the gemstone.

14. The computer program product according to claim 9, wherein the method further comprises fitting a template of a facet structure of a gemstone.

15. The computer program product according to claim 9, wherein the generating of the trained neural network comprises:
providing an untrained neural network with an input image of a gemstone;
registering that an output of the untrained neural network exists;
comparing, for each pixel in the input image, the output with a target output to generate an error signal for each pixel; and
iteratively repeating the providing, the registering and the comparing for multiple input images and multiple target outputs until the output of the untrained neural network approximates the target output.

16. The computer program product according to claim 9, wherein the generating of the trained neural network comprises training the untrained neural network to identify precise locations of inclusions within the gemstone and the method further comprises:
developing a plan to recut the gemstone around the precise locations to produce two or more secondary gemstones; and
re-cutting the gemstone into the secondary gemstones.

17. A gemstone analysis system comprising:
a camera;
a cutting tool;
a processor; and
a memory unit having executable instructions stored thereon, which, when executed, cause the processor to execute a gemstone clarity marking detection method comprising:
using a camera to generate a set of training pictures illustrating three-dimensional features of a gemstone cut with a pattern, each training picture in the set of training pictures comprising facets of and inclusions within the gemstone visible along a point-of-view (POV) through the gemstone;
generating a trained neural network by training an untrained neural network using the set of training pictures and a set of training sketches of edges of the facets of the gemstone generated from the set of training pictures such that, for each training picture, the trained neural network is capable of detecting facet edges to thereby produce machine-generated drawings approximating the facets of the gemstone in the training pictures and the training sketches the trained neural network was trained with; and
using the trained neural network to iteratively generate machine-generated drawings from the set of training pictures and to identify precise locations of inclusions within the gemstone,
wherein the generating of the trained neural network comprises providing an untrained neural network with an input image of a gemstone, registering that an output of the untrained neural network exists, comparing, for each pixel in the input image, the output with a target output to generate an error signal for each pixel, and iteratively repeating the providing, the registering and the comparing for multiple input images and multiple target outputs until the output of the untrained neural network approximates the target output, and
wherein the gemstone clarity marking detection method further comprises:

developing a plan to recut the gemstone around the precise locations to produce two or more secondary gemstones; and controlling the cutting tool to re-cut the gemstone into the secondary gemstones.

18. The gemstone analysis system according to claim 17, wherein the gemstone is a diamond and the cut pattern is one of round, princess, oval, marquise, pear, cushion, emerald, asscher, radiant and heart.

19. The gemstone analysis system according to claim 17, wherein the POV is a top-down, sideways or bottom-up POV.

20. The gemstone analysis system according to claim 17, wherein the pictures of the set of training pictures comprise digital images.

* * * * *